United States Patent [19]
Avis

[11] 3,748,839
[45] July 31, 1973

[54] SIDE DELIVERY BROOM
[75] Inventor: John M. Avis, Spring Lake, Mich.
[73] Assignee: Koehring Company, Milwaukee, Wis.
[22] Filed: Apr. 20, 1972
[21] Appl. No.: 245,985

[52] U.S. Cl.............. 56/328 R, 56/11.9, 56/15.8, 56/16.2, 56/377
[51] Int. Cl............................................. A01d 51/00
[58] Field of Search............... 56/328 R, 377, 366, 56/11.9, 15.8, 16.2

[56] References Cited
UNITED STATES PATENTS
| | | | |
|---|---|---|---|
| 2,775,090 | 12/1956 | Huffman | 56/376 |
| 2,854,808 | 10/1958 | Ramacher et al. | 56/328 R |
| 3,462,929 | 8/1969 | Ingalls | 56/328 R |
| 3,667,200 | 6/1972 | Pool et al. | 56/10.4 X |
| 3,712,039 | 1/1973 | Avis | 56/328 R |

FOREIGN PATENTS OR APPLICATIONS
1,272,929  8/1961  France............................ 56/328 R Primary Examiner—Russell R. Kinsey
Attorney—Andrew J. Beck

[57] ABSTRACT

A tractor mounted, side delivery broom of the type which has an elongated, rotatably driven broom arranged ahead of the tractor and at an angle to the direction of travel so as to sweep the crop material lying on the ground to the side of the vehicle and deposit the collected crop in a swath. The side delivery rake includes an articulated frame for mounting the rotatable broom on the front of a tractive vehicle so that the broom is free to move bodily in a vertical direction as well as have its ends rise and fall in opposition to one another, thereby insuring that the rotatable broom properly follows the contour of the ground over which it traverses.

11 Claims, 5 Drawing Figures

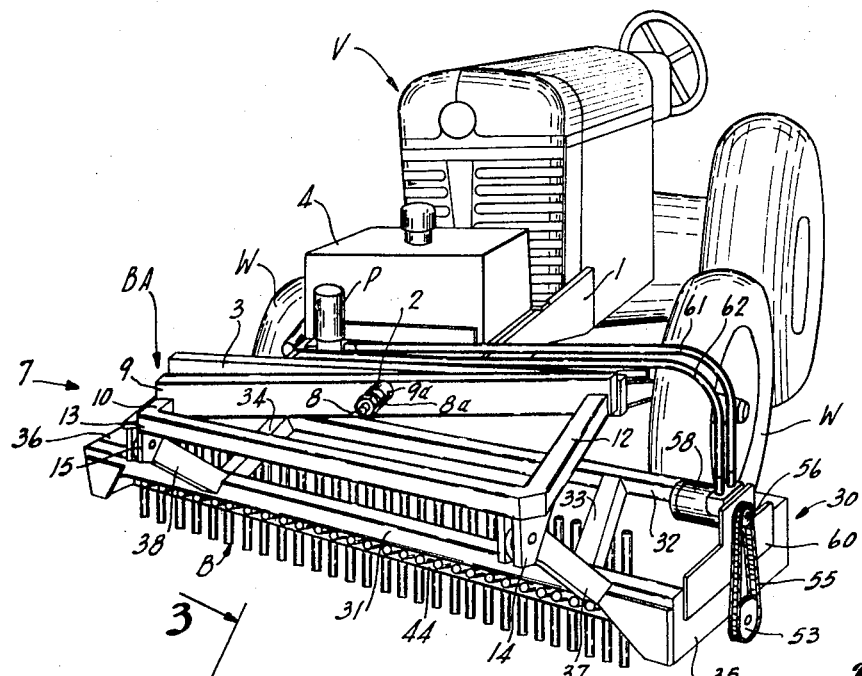
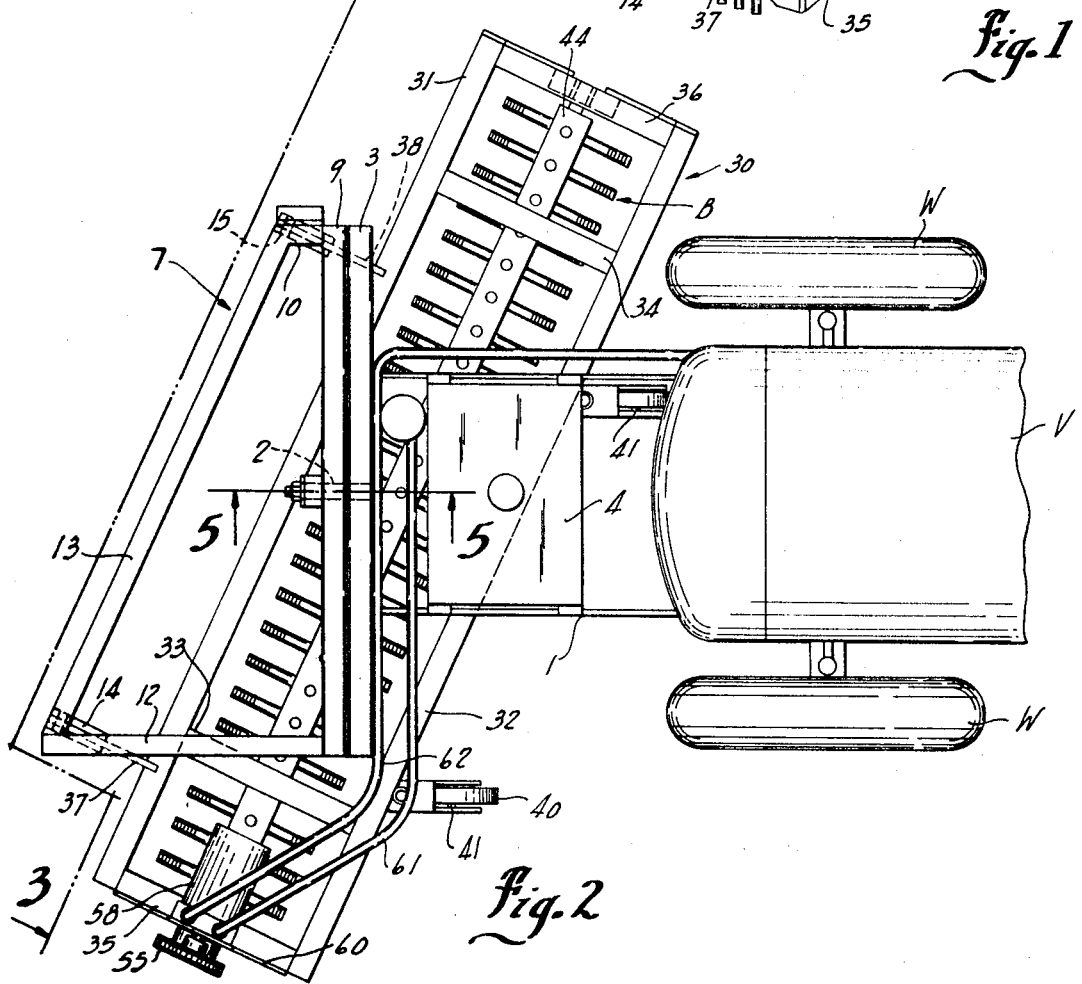

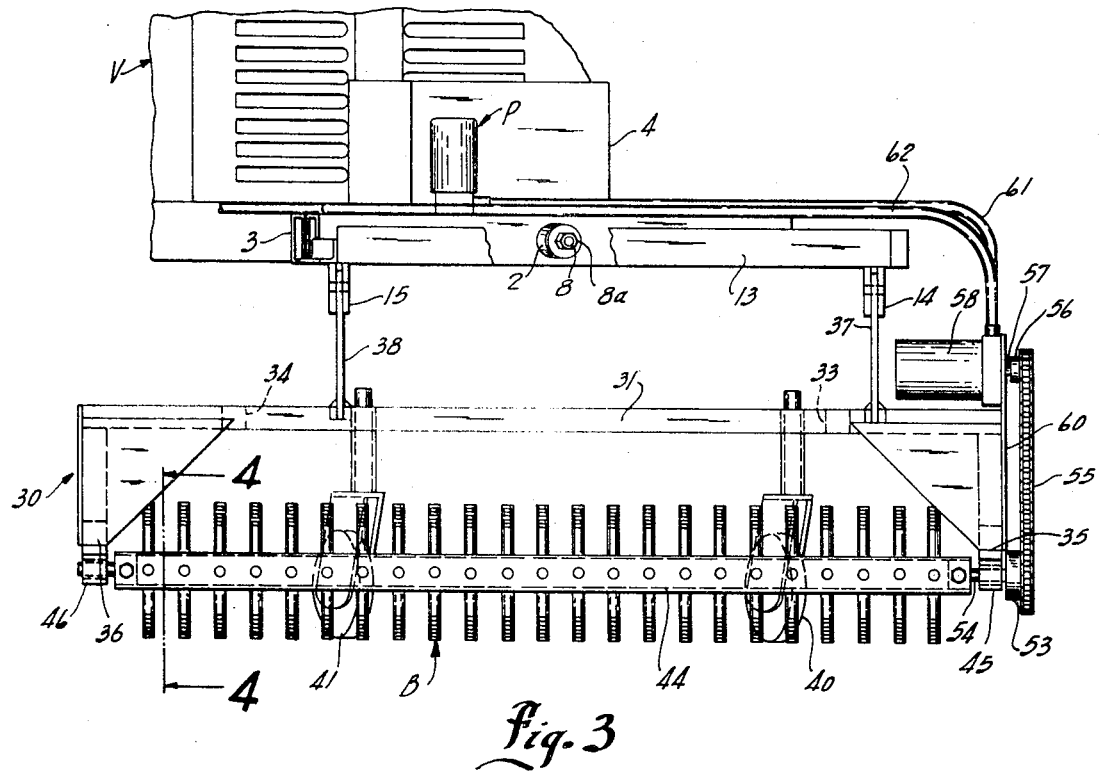
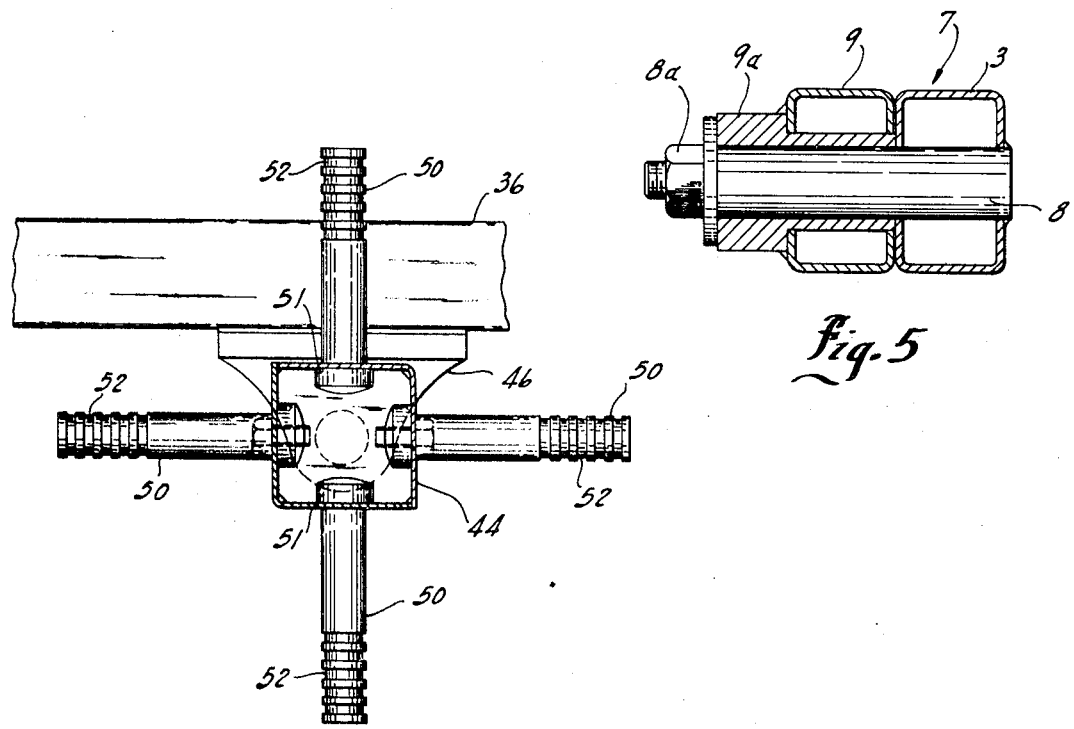

SIDE DELIVERY BROOM

BACKGROUND OF THE INVENTION

The invention pertains generally to harvesting equipment and more particular to side delivery rakes or brooms by means of which a crop lying on the ground is moved transversely of the rake as the latter moves along the ground, and the crop is deposited in a windrow at the side of the rake.

Various prior art types of side rakes have been proposed for mounting on a tractive vehicle and these include various types of ground, or crop engaging tines, paddles, blades and the like. These devices have operated with various degrees of success. In the harvesting of a fruit crop however, particularly oranges, it is necessary that the crop be positively and completely moved into the windrow without damage to the skin of the orange. The orange is not subject to damage so much from being bruised as it is from having its skin punctured. Prior art side delivery devices heretofore have injured not only the fruit itself, but also excessively dug into the ground. The result was to form a windrow of dirty and bruised fruit. Furthermore, many of these prior art devices had the power driven rake so mounted or the ground engaging teeth or paddles were of such construction, that they were unable to closely follow uneven and undulating ground, thereby resulting in loss of some of the crop.

SUMMARY OF THE INVENTION

The present invention provides a side delivery broom attached to the front end of a tractive vehicle and including a rotary power driven broom having a plurality of flexible, rubber fingers with serrations therearound. The angle of the broom with respect to the direction of travel is preferably a minimum of 25° from a normal position to the direction of travel. Furthermore, the present invention provides a harvester having a mounting frame for the power driven broom which permits the ends of the broom to rise and fall in opposition to one another and also permits the broom to bodily rise and fall as a unit, thereby permitting the flexible fingers to cleanly sweep the ground of the crop material and move it laterally to the side of the vehicle to a swath. With the present invention, the crop material, such as oranges, are contacted a minimum number of times by the teeth along the entire length of the broom, the movement of the crop being in the nature of several kicks or bounces ahead of the broom as the crop moves laterally. The fingers act to gently kick the crop material ahead of the broom and to one side thereof, and this is repeated, for example as many as five times for any particular crop that has to move the entire length of the broom. The result is a harvester which efficiently harvests the entire crop without damage thereof.

These and other objects and advantages of the present invention will appear hereinafter as this disclosure progresses, reference being had to the accompanying drawings.

BRIEF DESCRIPTION OF THE DRAWINGS

FIG. 1 is a perspective view of the invention taken generally from the front end thereof;

FIG. 2 is a plan view of the device shown in FIG. 1, but on an enlarged scale;

FIG. 3 is a front view taken generally along the line 3—3 in FIG. 2;

FIG. 4 is a sectional view taken along the line 4—4 in FIG. 3, but on an enlarged scale; and FIG. 5 is a sectional view taken along line 5—5 in FIG. 2, but on an enlarged scale.

DESCRIPTION OF A PREFERRED EMBODIMENT

A side delivery broom apparatus BA is shown as being attached to a self-propelled tractive vehicle V having a pair of front steerable wheels W at the front end thereof. The broom assembly includes a rigid mounting frame 1 which is securely attached to the front end of the tractive vehicle by bolt means 2 and which frame extends forwardly of the tractor at a fixed elevation from the ground. This rigid frame includes a transverse front member 3, and a fluid reservoir 4 is fixed to the top of the rigid frame.

An upper sub-frame 7 is pivotally attached intermediate its transverse length to the rigid frame by means of the centrally located, and fore and aft arranged shaft 8 which extends from the rigid frame. A nut 8a threaded on the front end of the shaft holds the sub-frame captive on the rigid frame and permits the sub-frame to oscillate about the fore and aft and generally hoirzontal axis. The sub-frame includes a rear, transversely positioned member 9 through which the shaft 8 extends.

More specifically, the member 9 has a large hub 9a centrally fixed thereto and through which the shaft 8 extends for a good bearing support. The sub-frame also includes a short side member 10 and an opposite and longer side member 12. The forward ends of these side members are then rigidly connected together by the front member 13 which is thus positioned at an angle to the direction of travel of the vehicle when the latter is moving straight ahead. Attached to the lower, opposite ends of the front member 13 are a pair of spaced apart, bifurcated brackets 14 and 15.

An elongated frame 30 is pivoted to frame 7 for swinging bodily in a generally vertical direction, as follows. Frame 30 is comprised of a front member 31, a rear member 32, two intermediate braces 33 and 34, and two end braces 35 and 36, all of which are welded or otherwise secured together to form the generally elongated frame. This frame also includes a pair of forwardly and upwardly extending arms 37 and 38 welded thereto and which are pivotally mounted at their upper free ends in the bifurcated brackets 14 and 15, respectively of the upper sub-frame. In this manner, the elongated lower frame is mounted at an angle with respect to the direction of vehicle travel in the normal forward direction. A pair of caster type gauge wheels 40 and 41 are mounted in transversely, spaced relationship on the rear member 32 of the lower frame 30 and act to maintain the frame at a constant elevation from the ground.

A rotary, power driven broom B is journalled by its central, tubular shaft 44 in suitable anti-friction bearings 45 and 46 that are secured to the end braces 35 and 36 of the lower frame.

The broom includes central, tubular main shaft 44 which is fabricated from heavy sheet steel. As shown in FIG. 4, this main shaft 44 is generally square in cross section and a series of rubber fingers 50 are secured along each side of the tubular shaft and spaced axially therealong. These rubber fingers have an enlarged, inner end 51 located within the shaft and are held in fixed relationship on the shaft. The fingers are fabricated from rubber and have annular grooves 52 around their periphery to provide a serrated finger.

The broom is rotatably driven as follows. A sprocket 53 is fixed on one of its stub shafts 54, and an endless chain 55 is trained around sprocket 53 and is also trained over the sprocket 56 of the fluid motor shaft 57. The fluid motor 58 is rigidly fixed to one end of the lower frame by means of a plate-like mounting bracket 60, and the motor 58 is in fluid communication, via flexible conduits 61 and 62, with a fluid pump P carried by the tractor.

RESUME

With the above construction, a three part articulated frame assembly is provided for mounting on a tractive vehicle, which frame has a first part with means for rigid attachment to a tractive vehicle, a second part that is pivotally connected to the first part about a fore and aft, generally horizontal axis, and a third part that is pivoted on said second part for bodily and generally vertical swinging movement. The power driven broom is mounted on the third part at an angle of at least 25° to the normal of the direction whereby the ends of the broom are permitted to rise and fall in opposition to one another about the central pivot axis 8 and at the same time the entire broom is free to rise and fall bodily. This construction permits the rake to follow undulating ground and cleanly sweep the ground as it is supported by its gauge wheels.

The action of the rubber fingers on the crop of oranges is such that as the broom is driven at a speed of approximately 25 revolutions per minute, and with the broom arranged at a minimum angle of about 25° in respect to a line normal to the direction of travel, any particular crop will be contacted approximately five times by the broom in moving from one extreme end of the broom to the other. This is accomplished by the fact that the fingers kick or bounce the crop approximately 8 to 12 inches along the length of the broom each time the orange is struck by the fingers. This sweeping action is positive in moving the oranges, but at the same time does not break the skin.

I claim:

1. A side delivery broom assembly for harvesting a crop lying on the ground, said broom assembly comprising, a rigid frame having means for being rigidly mounted to a tractive vehicle at the front end thereof and extending forwardly therefrom, a sub-frame pivotally mounted intermediate its transverse length to said rigid frame about a generally horizontal and fore and aft axis, an elongated frame having a portion pivotally mounted to said sub-frame, a power driven elongated broom rotatably mounted on said elongated frame about a generally horizontal axis and at an angle to the direction of travel, means for power rotating said broom in a direction so that the lowermost portion of said broom moves in a generally forward direction, said broom including a rotatably driven member having a plurality of axially spaced, rubber fingers extending around the periphery thereof, whereby as said broom is rotated and moved over the ground, said fingers contact and move a crop lying on the ground in a generally transverse direction and into a swath at one side.

2. The assembly as set forth in claim 1 further characterized in that said means for power rotating said broom comprises a fluid motor mounted on said elongated frame, and flexible fluid conduit means extending from said motor and having connecting means for attachment to a pump carried by said vehicle.

3. A side delivery broom assembly for harvesting a crop lying on the ground, said broom assembly comprising, a rigid frame having means for being rigidly mounted to a tractive vehicle at the front end thereof and extending forwardly therefrom, a sub-frame pivotally mounted intermediate its transverse length to said rigid frame about a generally horizontal and fore and aft axis, an elongated frame having an upwardly extending portion pivotally mounted at its upper free end to said sub-frame, a power driven elongated broom rotatably mounted on said elongated frame about a generally horizontal axis and at an angle of at least 25 degrees with respect to a line normal to the direction of travel, means for power rotating said broom in a direction so that the lowermost portion of said broom moves in a generally forward direction, said broom including a central shaft having a plurality of axially spaced, rubber fingers extending around the periphery thereof, whereby as said broom is rotated, said fingers contact a crop lying on the ground and move said crop generally transversely and into a swath at one side of said assembly.

4. The assembly as set forth in claim 3 further characterized in that said means for power rotating said broom comprises a fluid motor mounted on said elongated frame, and flexible fluid conduit means extending from said motor and having connecting means for attachment to a pump carried by said vehicle.

5. A side delivery broom assembly for harvesting a crop lying on the ground and comprising, a three part articulated frame, said frame including a first part having means for being rigidly mounted to a tractive vehicle at the front end thereof and extending forwardly therefrom, a second part pivotally mounted intermediate its transverse length to said rigid frame about a generally horizontal and fore and aft axis, a third part pivotally mounted to said sub-frame for swinging bodily in a generally vertical direction, a power driven broom rotatably mounted on said third part about a generally horizontal axis and at an angle to the direction of travel, means for power rotating said broom in a direction so that the lowermost portion of said broom moves in a generally forward direction, said broom including flexible fingers extending therearound, whereby as said broom is rotated said fingers contact a crop lying on the ground and move said crop generally transversely and into a swath.

6. The broom assembly as set forth in claim 5 further characterized in that said flexible fingers are comprised of rubber and have annular grooves around the periphery thereof.

7. The broom assembly described in claim 5 further characterized in that said angle of said broom is at least approximately 25° with respect to a line normal to the direction of forward travel.

8. The broom assembly described in claim 6 further characterized in that said angle of said broom is at least approximately 25° with respect to a line normal to the direction of forward travel.

9. The broom assembly of claim 5 further characterized in that said means for power rotating said broom includes a fluid motor mounted on said third part and flexible conduit means extending from said motor and having connection means for attachment to a fluid pump.

10. The broom assembly of claim 6 further characterized in that said means for power rotating said broom includes a fluid motor mounted on said third part and flexible conduit means extending from said motor and having connection means for attachment to a fluid pump.

11. The broom assembly of claim 8 further characterized in that said means for power rotating said broom includes a fluid motor mounted on said third part and flexible conduit means extending from said motor and having connection means for attachment to a fluid pump.

* * * * *